(12) United States Patent
Ryder et al.

(10) Patent No.: US 7,372,955 B1
(45) Date of Patent: May 13, 2008

(54) SYSTEM AND METHOD FOR ACCESSING A WIRELESS NETWORK FROM A HANDSET CONNECTED TO A PUBLIC WIRING NETWORK

(75) Inventors: Brian Ryder, Morrisville, NC (US); Anthony B. Black, Hillsborough, NC (US)

(73) Assignee: Cisco Technology, Inc., San Jose, CA (US)

( * ) Notice: Subject to any disclaimer, the term of this patent is extended or adjusted under 35 U.S.C. 154(b) by 366 days.

(21) Appl. No.: 09/728,913

(22) Filed: Feb. 26, 2001

(51) Int. Cl.
  *H04M 7/00* (2006.01)
(52) U.S. Cl. .................. 379/221.14; 379/221.01
(58) Field of Classification Search ............ 379/221.01, 379/221.14; 455/554.2, 462, 465, 74.1, 560, 455/557, 417, 414.1
See application file for complete search history.

(56) References Cited

U.S. PATENT DOCUMENTS

| | | | |
|---|---|---|---|
| 5,353,331 A | 10/1994 | Emery et al. | |
| 5,469,496 A | 11/1995 | Emery et al. | |
| 5,506,887 A | 4/1996 | Emery et al. | |
| 5,526,403 A * | 6/1996 | Tam | 455/426.1 |
| 5,579,379 A | 11/1996 | D'Amico et al. | |
| 5,592,533 A | 1/1997 | McHenry et al. | |
| 5,610,969 A | 3/1997 | McHenry et al. | |
| 5,610,972 A | 3/1997 | Emery et al. | |
| 5,664,005 A | 9/1997 | Emery et al. | |
| 5,758,281 A | 5/1998 | Emery et al. | |
| 5,771,465 A * | 6/1998 | Bojeryd | 455/554 |
| 5,845,203 A | 12/1998 | LaDue | |
| 5,911,123 A * | 6/1999 | Shaffer et al. | 455/554.1 |
| 5,995,828 A * | 11/1999 | Nishida | 455/417 |
| 5,999,808 A | 12/1999 | LaDue | |
| 6,002,937 A * | 12/1999 | Young et al. | 455/462 |
| 6,011,975 A | 1/2000 | Emery et al. | |
| 6,014,377 A * | 1/2000 | Gillespie | 370/351 |
| 6,044,225 A * | 3/2000 | Spencer et al. | 710/52 |
| 6,070,070 A | 5/2000 | Ladue | |
| 6,073,029 A * | 6/2000 | Smith et al. | 455/555 |
| 6,081,731 A * | 6/2000 | Boltz et al. | 455/565 |
| 6,256,503 B1 * | 7/2001 | Stephens | 455/456.6 |
| 6,282,274 B1 | 8/2001 | Jain et al. | |
| 6,307,956 B1 | 10/2001 | Black | |
| 6,320,947 B1 | 11/2001 | Joyce et al. | |
| 6,343,220 B1 * | 1/2002 | Van Der Salm | 455/552.1 |
| 6,366,784 B1 * | 4/2002 | Hsueh | 455/462 |
| 6,405,028 B1 | 6/2002 | DePaola et al. | |
| 6,466,799 B1 * | 10/2002 | Torrey et al. | 455/462 |
| 6,480,714 B1 * | 11/2002 | DePani et al. | 455/422.1 |
| 6,539,101 B1 | 3/2003 | Black | |
| 6,546,238 B1 | 4/2003 | Nightingale et al. | |
| 6,556,818 B1 | 4/2003 | Meehan | |
| 6,625,423 B1 * | 9/2003 | Wang | 455/74.1 |
| 6,705,916 B2 * | 3/2004 | Roberts et al. | 455/445 |
| 6,738,616 B1 * | 5/2004 | Link et al. | 455/417 |
| 6,741,835 B2 * | 5/2004 | Pulver | 455/3.05 |

(Continued)

*Primary Examiner*—William J. Deane, Jr.
(74) *Attorney, Agent, or Firm*—Blakely, Sokoloff, Taylor & Zafman LLP (57) ABSTRACT

A system and method for accessing a wireless network from a handset connected to a public wiring network are described. A request to establish a communication is received from a user interface. A connection path is determined for the communication based on an identification parameter of the communication. Finally, the communication is transmitted along the connection path.

49 Claims, 5 Drawing Sheets

U.S. PATENT DOCUMENTS

| | | | |
|---|---|---|---|
| 6,792,095 B1 * | 9/2004 | Frank | 379/216.01 |
| 6,804,536 B1 * | 10/2004 | Bultman | 455/557 |
| 7,089,034 B1 * | 8/2006 | Schornack et al. | 455/554.1 |
| 2001/0003706 A1 * | 6/2001 | Warburton et al. | |
| 2001/0029186 A1 | 10/2001 | Canyon | |
| 2001/0046215 A1 * | 11/2001 | Kim | |
| 2002/0019228 A1 | 2/2002 | McKenna | |
| 2002/0039907 A1 | 4/2002 | McKenna | |
| 2004/0033809 A1 * | 2/2004 | Smith et al. | 455/461 |
| 2005/0190789 A1 * | 9/2005 | Salkini et al. | |

* cited by examiner

SYSTEM AND METHOD FOR ACCESSING A WIRELESS NETWORK FROM A HANDSET CONNECTED TO A PUBLIC WIRING NETWORK

FIELD OF THE INVENTION

The present invention relates generally to wireless communications and, more particularly, to a system and method for accessing a wireless network from a handset connected to a public wiring network.

BACKGROUND OF THE INVENTION

A vast majority of the telephone systems installed in private residences and offices are configured to include one connection to a public wiring network, such as a public switched telephone network (PSTN), which services all handsets existent in the residence or in the office. This method of distributing a telephone signal allows each handset to access the public telephone network in order to establish a telephone communication. Each handset may access the public telephone network to establish a local communication, within a predetermined local area code, or a long distance communication, outside of the predetermined local area code.

Generally, the connection to the public wiring network requires a service agreement with two telephone service providers, one providing access to local communications only, and the other providing access to long distance communications only. Alternatively, one service provider may provide access to both local and long distance communications.

Recently, a method has been developed to bypass either service provider by dialing a number of predetermined access digits, thereby connecting to a remote service provider. However, in any of the above-mentioned situations, communications are transmitted along the lines of the public wiring network. As a result, customers are restricted to certain local and long distance pricing set by companies providing service within the public wiring network.

SUMMARY OF THE INVENTION

A system and method for accessing a wireless network from a handset connected to a public wiring network are described. A request to establish a communication is received from a user interface. A connection path is determined for the communication based on an identification parameter of the communication. Finally, the communication is transmitted along the connection path.

Other features and advantages of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

According to embodiments described herein, a system and method for accessing a wireless network from a handset connected to a public wiring network are described.

Figure 1:
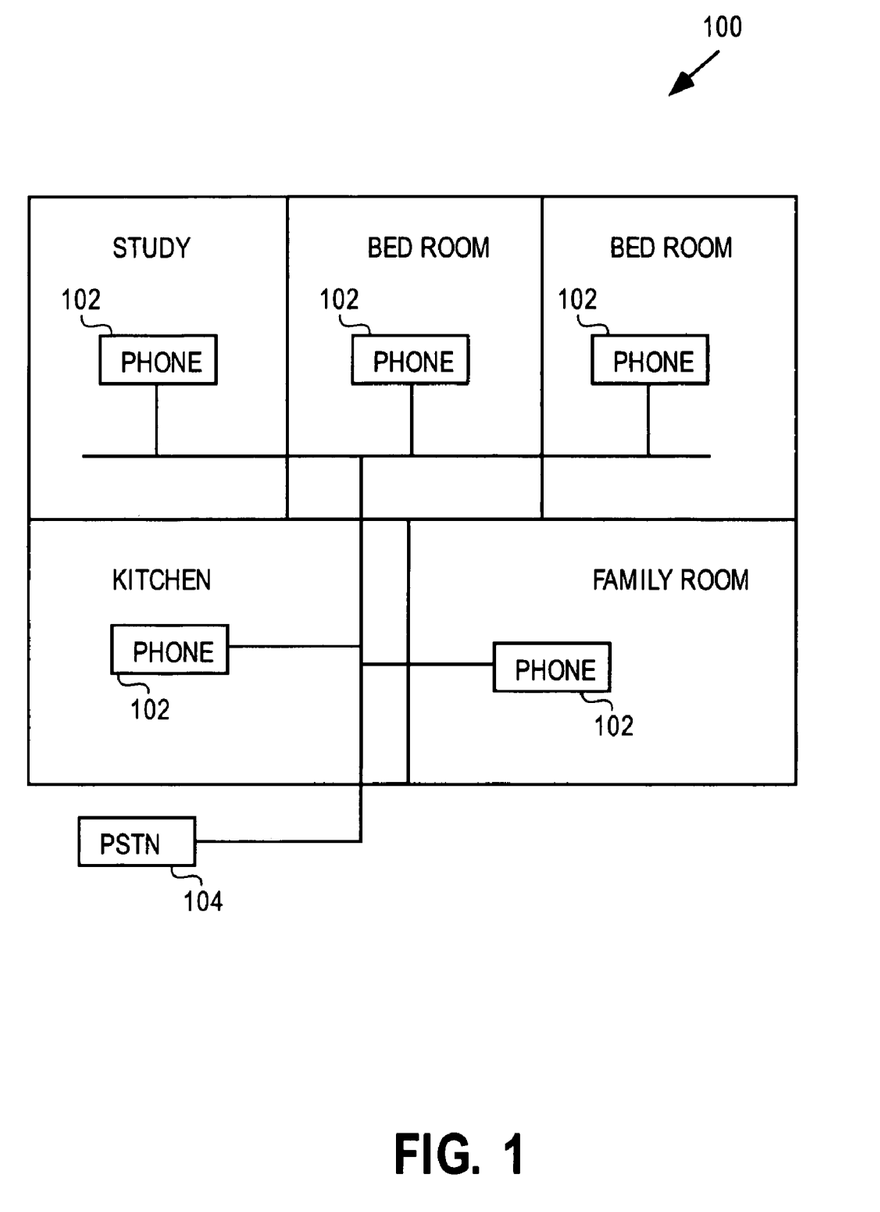
FIG. 1 is a block diagram of a system for connecting handsets to a public wiring network.

FIG. 1 is a block diagram of a system for connecting handsets to a public wiring network. As illustrated in FIG. 1, in one embodiment, system 100 includes multiple handsets 102, for example telephones, residing in several rooms of a residence, the rooms being labeled study, bedroom, kitchen, and family room. Telephone handsets 102 are interconnected through a residential wiring network.

In one embodiment, each telephone 102 is located in one room of the residence. Alternatively, several telephones 102 may be located in a single room. In one embodiment, all telephone handsets 102 are connected to a public wiring network, for example a public telephone network, through a Public Switched Telephone Network module (PSTN) 104. PSTN 104 enables transmission of outgoing and incoming communications, for example phone calls made from/to the telephone handsets 102.

Figure 2:
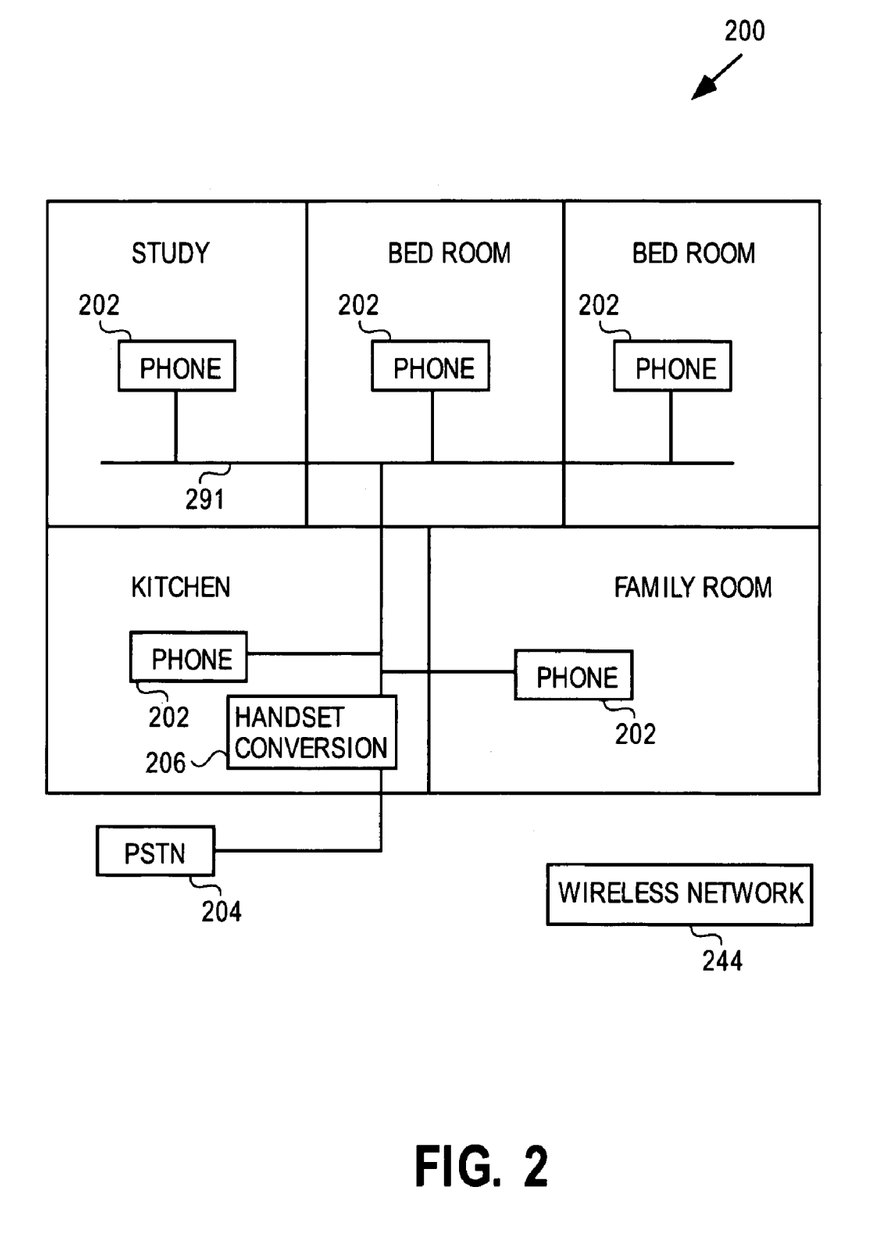
FIG. 2 is a block diagram of one embodiment of a system for accessing a wireless network.

FIG. 2 is a block diagram of one embodiment of a system for accessing a wireless network 244. As illustrated in FIG. 2, in one embodiment, system 200 includes multiple handsets 202, for example telephones, residing in several rooms of a residence, the rooms being labeled study, bedroom, kitchen, and family room. Telephone handsets 202 are interconnected through a residential wiring network 291.

In one embodiment, each telephone 202 is located in one room of the residence. Alternatively, several telephones 202 may be located in a single room. In one embodiment, all telephone handsets 202 are connected to a handset conversion unit 206, which in turn connects to a public wiring network, for example a public telephone network, via a Public Switched Telephone Network module (PSTN) 204.

PSTN 104 enables transmission of outgoing and incoming communications, for example phone calls made from/to the telephone handsets 202. In one embodiment, the handset conversion unit 206 is configured to select a connection path for each communication made from/to the telephone handsets 202, as described in further detail below.

Figure 3:
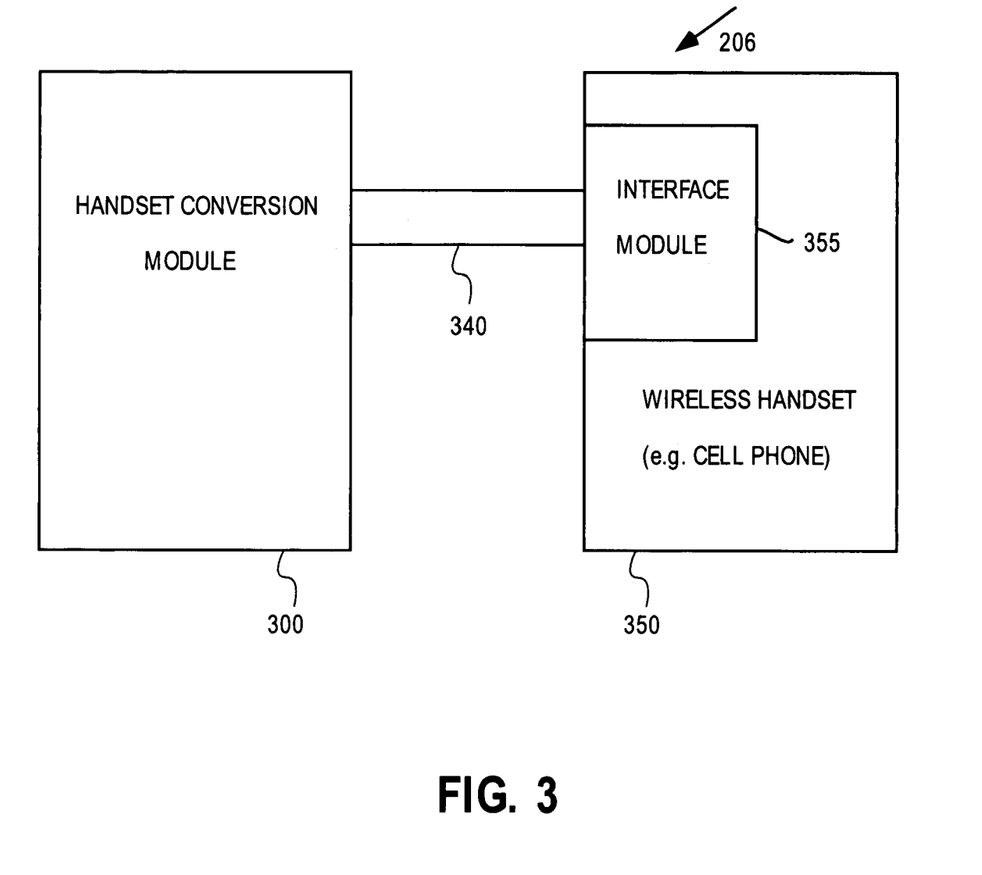
FIG. 3 is a block diagram of one embodiment of a handset conversion unit within the system.

FIG. 3 is a block diagram of one embodiment of a handset conversion unit 206 within the system 200. As illustrated in FIG. 3, in one embodiment, the handset conversion unit 206 includes a handset conversion module 300 coupled to a wireless handset 350, for example a cellular phone, through a bus system 340, for example a serial bus. The wireless handset 350 further includes an interface module 355 coupled to the handset conversion module 300.

In one embodiment, handset conversion module 300 interacts with cellular phone 350 and detects the interface module 355 to establish a connection via bus 340. The handset conversion module 300 will be described in further detail below.

Figure 4:
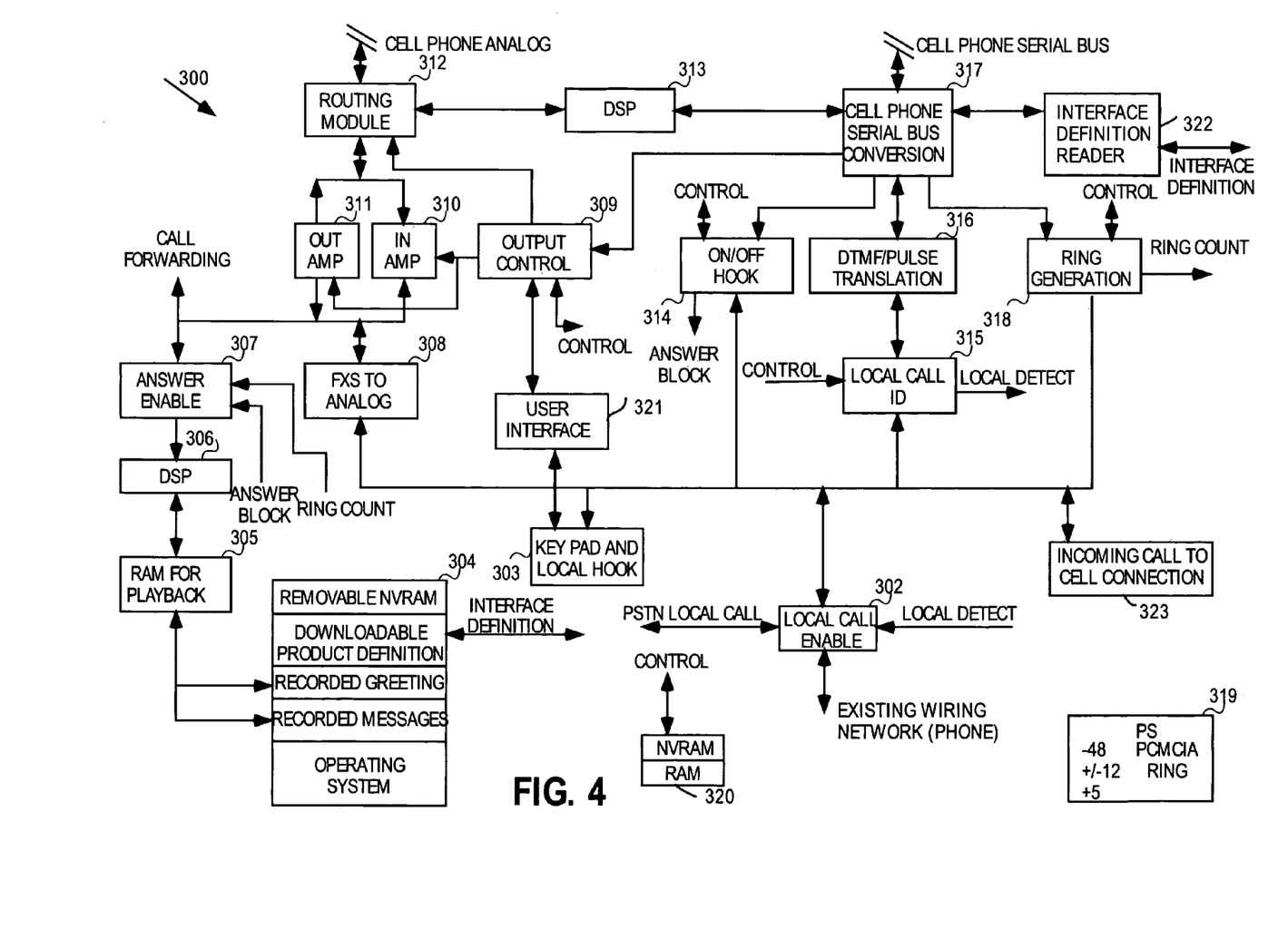
FIG. 4 is a block diagram of one embodiment of a handset conversion module within the handset conversion unit.

FIG. 4 is a block diagram of one embodiment of a handset conversion module 300 within the handset conversion unit 206. As illustrated in FIG. 4, in one embodiment, the handset conversion module 300 includes a local call enable module 302 for connecting to the existing wiring network within the residence. The local call enable module 302 enables a local connection path through the public telephone network or a long distance path through the wireless network.

The handset conversion module 300 further includes a serial bus conversion module 317 for connecting to the serial bus 340 shown in FIG. 3. The serial bus conversion module 317 converts signals processed within the handset conversion module 300 into a data stream and forwards the data stream along bus 340 to the wireless handset 350 for execution.

In one embodiment, if a user decides to place an outgoing communication, such as a phone call, from a handset 102 within the residential wiring network, the call is detected by the local call enable module 302. The local call enable module 302 transmits a LOCAL ID signal to a local call ID module 315 within the handset conversion module 300.

The local call ID module 315 is configured to determine if the outgoing call is going to a local destination by comparing an identification parameter of the call to a predetermined code. In one embodiment, the predetermined code is stored in a removable memory module 304 included within handset conversion module 300. The code indicates a programmable local transmission area of the phone call. The identification parameter includes one or more tone signals embodying a certain number of digits of the phone call, such as a local area code of the phone number dialed.

In one embodiment, if the identification parameter matches the predetermined code, the local call ID module 315 activates a LOCAL DETECT signal and transmits that signal to the local call enable module 302. Upon receipt of the LOCAL DETECT signal, the local call enable module 302 routes the call to the public switched telephone network (PSTN) 204 shown in FIG. 2, and establishes a connection path within PSTN 204 for transmission of the phone call.

Alternatively, if the identification parameter does not match the predetermined code, the call is transmitted to a DTMF/pulse translation module 316 contained within the conversion module 300. Translation module 316 is configured to translate the outgoing tone signals of the phone call into multiple messages to be passed to the serial bus conversion module 317.

In one embodiment, voice data within the phone call is transmitted to an FXS to analog module 308. The FXS to analog module 308 formats the outgoing voice data stream for a signal level required for an output amplifier 311. The output amplifier 311 amplifies the voice signal to a predetermined signal level and transmits the voice data to a routing module 312. The routing module 312 is configured to route the analog voice data to the wireless handset 350.

In one embodiment, the serial bus conversion module 317 detects the interface module 355 of the wireless handset 350 and transmits an INTERFACE DEFINITION signal to the removable memory module 304 to retrieve downloadable product definition information related to interface 355. In one embodiment, memory module 304 stores a database of approved wireless handset characteristics, including the downloadable product definition information.

Serial bus conversion module 317 retrieves the definition information for the connected wireless handset 350 using an interface definition reader 322 and converts the multiple messages into a data stream executable by the wireless handset 350. A portion of the retrieved definition information relates to the voice path of the wireless handset 350. In one embodiment, the wireless handset 350 supports voice data through the serial bus. Alternatively, wireless handset 350 may be unable to support voice data through the serial bus 340.

The serial bus conversion module 317 also retrieves information about the phone handset 202 attempting to make the phone call via a user interface 321 coupled to an output control module 309. In one embodiment, output control module 309 provides control function over various modules capable of accepting programmable inputs, for example the user interface 321.

In one embodiment, the user interface 321 provides the ability to configure the system using input from a keypad, display, and local hook interface 303 accessible to the user. Interface 303 is coupled to a handset 202 and enables the user to originate, as well as terminate phone calls, using a keypad, and to view data, such as the phone number dialed, on a display.

After conversion of the messages into data stream executable by the wireless handset 350, serial bus conversion module 317 forwards data to the wireless handset via serial bus 340 and a connection is established to allow the outgoing phone call to be made using the wireless network. In one embodiment, if the wireless handset 350 supports voice data through the serial bus 340, serial bus conversion module 317 informs the output control module 309 that voice data may be sent through the serial bus 340 along the active connection. If the output control module 309 is set to send the voice data through the serial bus 340, the routing module 312 routes the analog voice data to a DSP module 313. The DSP module 313 converts the analog output of the routing module 312 to a voice data stream for transmission to the serial bus conversion module 317.

Alternatively, if the wireless handset 350 does not support voice data through serial bus 340, and the output control module 312 is not configured to send voice data through the serial bus 340, voice data will be transmitted through a cell phone analog interface to the wireless handset's hands free interface.

At the end of the outgoing call, an on/off hook module 314 is configured to transmit a signal to the serial bus conversion module 317, signaling that the call has been terminated/released by a handset going on or off the hook.

In an alternate embodiment, if an incoming communication from the wireless network or the public telephone network needs to reach a handset 202 within the residential wiring network, the serial bus conversion module 317 triggers a ring generation module 318 to start a configured ring signal pattern. Once the ring generation module 318 detects the trigger signal, ring signals are sent to the handsets 202. In one embodiment, the ring generation module 318 is configured to change ringing parameters, such as cadence and frequency, in order to provide an indication to the user as to the origin of the incoming call, whether through the wireless handset or through the local input of the local call enable module 302.

In one embodiment, the ring generation module 318 also generates a RING COUNT signal. The RING COUNT signal is configured to trigger an answer enable module 307 to enable an answering machine (not shown) to answer the phone call after a predetermined delay. In one embodiment, the answering machine includes the answer enable module 307, a RAM for playback interface 305, and an answering machine DSP module 306. The answering machine DSP module 306 is coupled to the answer enable module 307 to allow conversion of analog/digital input/output messages for proper format.

In one embodiment, the RAM for playback interface 305 loads an outgoing prerecorded message stored in a removable NVRAM within the removable memory 304. RAM interface 305 also saves an incoming message it receives from the answering machine DSP module 306. Upon completion of the incoming message, data will be stored on the removable NVRAM within the removable memory 304.

In one embodiment, the answer enable module 307 also communicates with the on/off hook module 314 via an ANSWER BLOCK signal to activate the on/off hook module 314.

In one embodiment, a call forwarding function allows the user to choose whether the answering machine will forward the incoming call through the wireless handset to a pre-programmed number or collect an incoming message to be stored. An additional connection to the public telephone network at the local call enable module 302 will allow any unanswered calls to be forwarded to the wireless handset 350.

In one embodiment, if the phone call is answered by one of the handsets 202, the on/off hook module 314 sends a signal to the serial bus conversion module 317 to start conversion of data. In one embodiment, if the serial bus conversion module 317 determines that the wireless handset 350 supports voice data through the serial bus 340, serial bus conversion module 317 informs the output control module 309 that voice data may be sent through the serial bus 340 along an active connection. If the output control module 309 is set to send the voice data through the serial bus 340, serial bus conversion module 317 routes voice data to the DSP module 313 and further to the routing module 312. Alternatively, voice data is received by the routing module 312 through the cell phone analog interface.

Voice data is then transmitted to an input amplifier 310, which conditions the signal for the proper signal levels for the FXS to analog module 308. The FXS to analog module 308 converts the incoming voice signal and transmits the signal to the handsets 202 via the local call enable module 302.

In one embodiment, a user may access the handset conversion module 300 through an incoming call to cell connection module 323. The connection module 323 allows the user to connect to the handset conversion module 300 from a remote handset, enter a password or other type of identifier and make a phone call through the wireless handset 350.

In one embodiment, conversion module 300 further includes a memory 320 having a RAM portion for storing the executable instructions of the operating software running on the handset conversion module 300 and a NVRAM portion for storing a configuration of the handset conversion module 300. The handset conversion module 300 also includes a power supply source 319 for providing power to the above-described modules, as well as ringing voltage.

Figure 5:
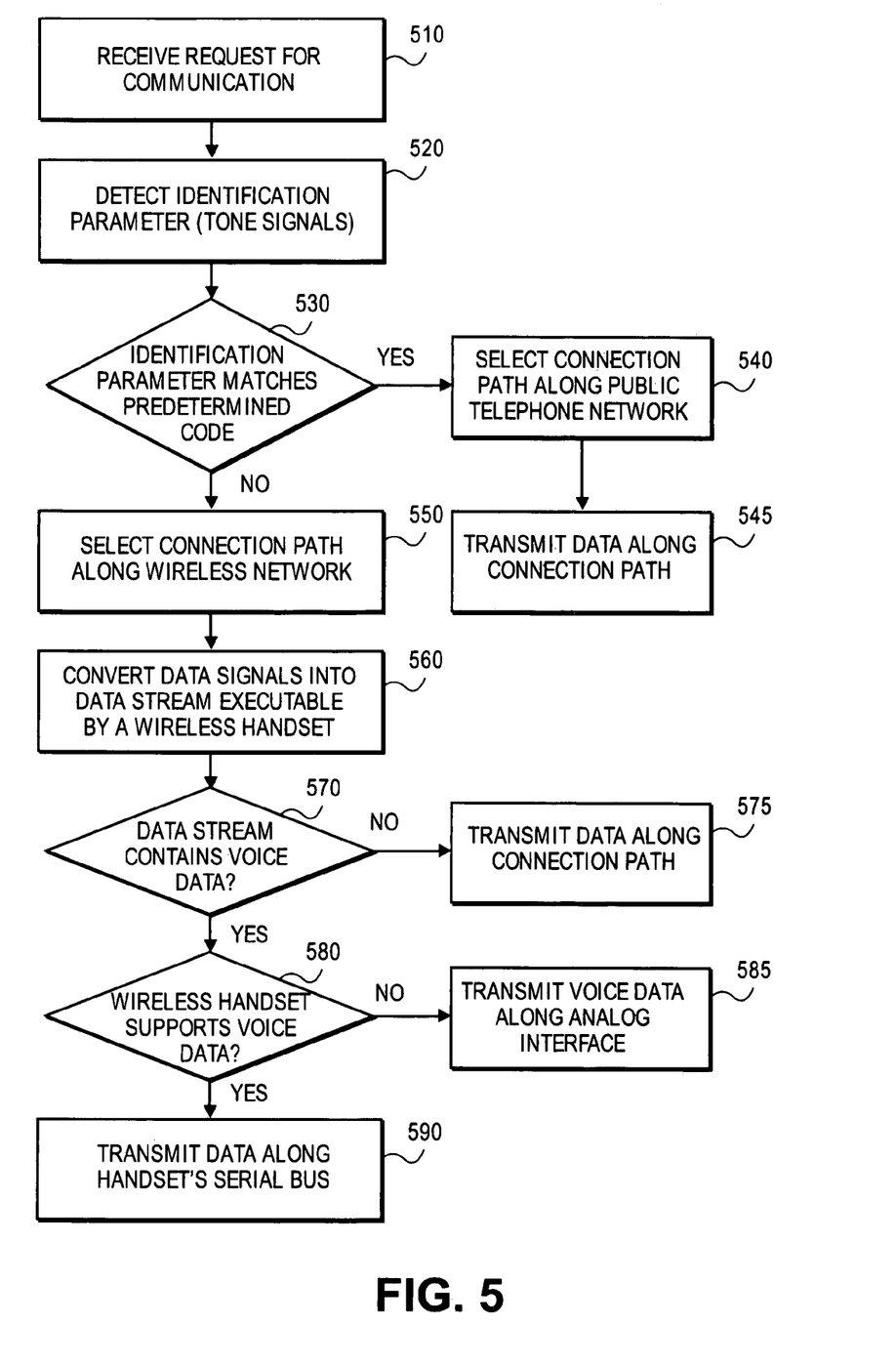
FIG. 5 is a flow diagram of one embodiment of a method for accessing a wireless network.

FIG. 5 is a flow diagram of one embodiment of a method for accessing a wireless network. As illustrated in FIG. 5, at processing block 510, a request for a communication is received. In one embodiment, a handset within the residential wiring network is activated and multiple tone signals identifying the communication are received.

At processing block 520, an identification parameter for the communication is detected. In one embodiment, the identification parameter includes one or more tone signals. At processing block 530, a decision is made whether the identification parameter matches a predetermined code indicating a predetermined transmission area for the communication.

If the identification parameter matches the predetermined code, at processing block 540, a connection path is selected along a public telephone network. Further, at processing block 545, the communication data is transmitted along the connection path.

Otherwise, if the identification parameter does not match the predetermined code, at processing block 550, a connection path is selected along a wireless network. In one embodiment, an interface of a wireless handset is detected and definition information related to the interface is retrieved. Next, at processing block 560, communication data is converted into a data stream executable by the wireless handset.

At processing block 570, a decision is made whether the converted data stream contains voice data. If the data stream contains no voice data, then data is transmitted along the connection path at processing block 575.

Otherwise, if the data stream contains voice data, at processing block 580, a decision is made whether a serial bus of the wireless handset supports voice data. In one embodiment, the retrieved definition information related to the interface of the wireless handset contains information relating to voice data support.

If the serial bus of the wireless handset does not support voice data, at processing block 585, voice data is transmitted along an analog interface of the wireless handset. Otherwise, at processing block 590, voice data is transmitted along the serial bus of the wireless handset.

It is to be understood that embodiments of this invention may be used as or to support software programs executed upon some form of processing core (such as the CPU of a computer) or otherwise implemented or realized upon or within a machine or computer readable medium. A machine readable medium includes any mechanism for storing or transmitting information in a form readable by a machine (e.g., a computer). For example, a machine readable medium includes read-only memory (ROM); random access memory (RAM); magnetic disk storage media; optical storage media; flash memory devices; electrical, optical, acoustical or other form of propagated signals (e.g., carrier waves, infrared signals, digital signals, etc.); or any other type of media suitable for storing or transmitting information.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method, comprising:
   receiving a request for establishing a communication from a user interface;
   determining a connection path for said communication based on an identification parameter of said communication;
   detecting a wired interface of a wireless handset;
   retrieving a profile of said interface from a storage module; and
   transmitting said communication along said connection path.

2. A method, comprising:
   receiving a communication from a network;
   detecting a signal from a user, said signal enabling said communication;
   detecting a wired interface of a wireless handset and retrieving a profile of said interface from a storage module; and
   transmitting said communication to said user.

3. An apparatus, comprising:
   a handset conversion module for receiving a request for establishing a communication from a user interface, determining a connection path for said communication based on an identification parameter of said communication, detecting a wired interface of a wireless handset, retrieving a profile of said interface from a storage module, and transmitting said communication along said connection path.

4. An apparatus, comprising:
a handset conversion module for receiving a communication from a network, detecting a signal from a user, said signal enabling said communication, detecting a wired interface of a wireless handset and retrieving a profile of said interface from a storage module, and transmitting said communication to said user.

5. A conversion apparatus, comprising:
an enable module receiving a request for establishing a communication from a user interface;
an identification module coupled to said enable module for determining a connection path for said communication based on an identification parameter of said communication; and
a bus conversion module coupled to said identification module for detecting a wired interface of a wireless handset, retrieving a profile of said interface from a storage module, and transmitting said communication along said connection path.

6. A computer readable medium-containing executable instructions, which, when executed in a processing system, cause the system to perform a method, comprising:
receiving a request for establishing a communication from a user interface;
determining a connection path for said communication based on an identification parameter of said communication;
detecting a wired interface of a wireless handset;
retrieving a profile of said interface from a storage module; and
transmitting said communication along said connection path.

7. A computer readable medium-containing executable instructions, which, when executed in a processing system, cause the system to perform a method, comprising:
receiving a communication from a network;
detecting a signal from a user, said signal enabling said communication;
detecting a wired interface of a wireless handset and retrieving a profile of said interface from a storage module; and
transmitting said communication to said user.

8. An apparatus-comprising:
means for receiving a request for establishing a communication from a user interface;
means for determining a connection path for said communication based on an identification parameter of said communication;
means for detecting a wired interface of a wireless handset;
means for retrieving a profile of said interface from a storage module; and
means for transmitting said communication along said connection path.

9. An apparatus, comprising:
means for receiving a communication from a network;
means for detecting a signal from a user, said signal enabling said communication;
means for detecting a wired interface of a wireless handset;
means for retrieving a profile of said interface from a storage module; and
means for transmitting said communication to said user.

10. A method, comprising:
receiving a connection request from a first handset, the connection request including an identification parameter;
comparing the identification parameter to a predetermined code associated with a telephone calling area; and
selecting a connection path between the first handset and a second handset, the connection path selected from a wired network and a wireless network based on a comparison of the identification parameter to the predetermined code, wherein the wireless network comprises a wireless handset having a wired interface to the first handset.

11. The method of claim 10, wherein the second handset is a remote handset.

12. The method of claim 10, wherein the wired network is a public switched telephone network (PSTN).

13. The method of claim 10, wherein the wireless network is a cellular network.

14. The method of claim 10, wherein selecting the connection path comprises either selecting a local connection path through the wired network, wherein the wired network is a public switched telephone network (PSTN), or selecting a long distance connection path through the wireless network, wherein the wireless network is a cellular network.

15. The method of claim 14, further comprising transmitting a communication signal from the first handset to the second handset over the long distance connection path via the wireless handset, wherein the wireless handset is a cellular telephone.

16. The method of claim 15, further comprising connecting the first handset to the cellular telephone via a residential telephone network.

17. The method of claim 15, further comprising connecting the first handset to the cellular telephone via the public switched telephone network (PSTN).

18. The method of claim 10, wherein the identification parameter comprises a code representing a telephone area code.

19. The method of claim 10, wherein the identification parameter comprises at least one tone signal embodying a certain number of digits of a telephone call.

20. The method of claim 10, further comprising selecting the connection path in response to a determination that the identification parameter is different than the predetermined code.

21. The method of claim 10, further comprising:
detecting a wired interface of a third handset, wherein the third handset is the wireless handset; and
retrieving a profile of the interface from a storage module.

22. A method, comprising:
receiving an incoming communication signal including an identification parameter at a conversion module coupled to a residential wiring network, an external wired network, and an external wireless network comprising a wireless handset having a wired interface to the conversion module;
selecting a connection path for the incoming communication signal based on a comparison of the identification parameter to a predetermined code, the connection path including the residential wiring network and an external network, the external network selected from the external wired network and the external wireless network; and
communicating the incoming communication signal from the external network to the residential wiring network.

23. The method of claim 22, wherein the external wired network is a public switched telephone network (PSTN).

24. The method of claim 22, wherein the external wireless network is a cellular network and the wireless handset is a cellular telephone.

25. The method of claim 24, further comprising communicating the incoming communication signal from a remote handset through the cellular telephone to a wired handset coupled to the residential wiring network.

26. An apparatus, comprising:
a call enable module to receive a connection request from a first handset, the connection request including an identification parameter; and
a call identification module coupled to the call enable module, the call identification module to compare the identification parameter to a predetermined code associated with a telephone calling area, and the call identification module to select a connection path between the first handset and a second handset, the connection path selected from a wired network and a wireless network based on a comparison of the identification parameter to the predetermined code, wherein the wireless network comprises a wireless handset having a wired interface to the call identification module.

27. The apparatus of claim 26, wherein the wireless handset is a cellular telephone.

28. The apparatus of claim 27, wherein the wired interface comprises a bus system to couple the call identification module to an interface module of the cellular telephone.

29. The apparatus of claim 28, wherein the bus system is a serial bus.

30. The apparatus of claim 26, wherein the first handset is a wired handset and the second handset is a remote handset.

31. The apparatus of claim 26, further comprising a serial bus conversion module coupled to a dual tone multi-frequency (DTMF)/pulse translation module coupled to the call identification module, the DTMF/pulse translation module to translate a plurality of tone signals from the first handset into a plurality of messages, the serial bus conversion module to convert the plurality of messages from the DTMF/pulse translation module into a data stream.

32. The apparatus of claim 31, further comprising a routing module coupled to an output control module coupled to the serial bus conversion module, the routing module to transmit voice data from the first handset through a wired analog interface to a hands free interface of the wireless handset, wherein the connection path between the first and second handsets includes the wireless handset.

33. The apparatus of claim 31, further comprising a routing module coupled to a digital signal processing (DSP) module coupled to the serial bus conversion module, the routing module to route analog voice data from the first handset to the DSP module.

34. The apparatus of claim 33, wherein the DSP module is configured to convert the analog voice data into a voice data stream and to transmit the voice data stream to a serial bus conversion module.

35. The apparatus of claim 26, further comprising an incoming call to cell connection module to couple the enable module to the first handset, wherein the first handset is remotely located with respect to the enable module.

36. The apparatus of claim 26, further comprising:
a serial bus conversion module coupled to the call identification module, the serial bus conversion module to detect the wired interface of the wireless handset; and
an interface definition reader coupled to the serial bus conversion module, the interface definition reader to retrieve a profile of the interface from a storage module.

37. The apparatus of claim 36, further comprising an output control module to determine, according to the profile of the interface, whether to send voice data to the wireless handset over a serial bus coupled between the wireless handset and the serial bus conversion module.

38. The apparatus of claim 26, further comprising:
a foreign exchange station (FXS) module coupled to the call enable module, the FXS module to format voice data from the first handset for a signal level required for an output amplifier;
an on/off hook module coupled to the call enable module and to a serial bus conversion module, the on/off hook module to transmit a hook signal to the serial bus conversion module to indicate the on/off status of a connection at the call enable module;
a ring generation module coupled to the call enable module, the ring generation module to detect a trigger signal from an incoming telephone call and to send a ring signal to the first handset, the ring generation module also to generate a ring count signal; and
an answer enable module coupled to the FXS module, the answer enable module to enable an answering machine to answer the incoming telephone call in response to the ring count signal.

39. A method, comprising:
receiving a connection request including an identification parameter for a communication from a first handset;
selecting a connection path between the first handset and a second handset based on a comparison of the identification parameter with a predetermined code, the connection path selected from a first network and a second network, wherein the second network is a different network from the first network, wherein the first network is a wireless network comprising a wired interface to a wireless handset.

40. A computer readable medium containing executable instructions, which, when executed in a processing system, cause the system to perform operations comprising:
receiving a connection request from a first handset, the connection request including an identification parameter;
comparing the identification parameter to a predetermined code associated with a telephone calling area; and
selecting a connection path between the first handset and a second handset, the connection path selected from a wired network and a wireless network based on a comparison of the identification parameter to the predetermined code, wherein the wireless network comprises a wireless handset having a wired interface to the first handset.

41. The computer readable medium of claim 40, wherein selecting the connection path comprises either selecting a local connection path through the wired network, wherein the wired network is a public switched telephone network (PSTN), or selecting a long distance connection path through the wireless network, wherein the wireless network is a cellular network and the wireless handset is a cellular telephone.

42. The computer readable medium of claim 41, wherein the executable instructions further cause the system to transmit a communication signal from the first handset to the second handset over the long distance connection path via the wireless handset, wherein the wireless handset is a cellular telephone.

43. The computer readable medium of claim 42, wherein the executable instructions further cause the system to connect the first handset to the cellular telephone via a residential telephone network.

44. The computer readable medium of claim 42, wherein the executable instructions further cause the system to connect the first handset to the cellular telephone via the public switched telephone network (PSTN).

45. The computer readable medium of claim 40, wherein the executable instructions further cause the system to select the connection path in response to a determination that the identification parameter is different than the predetermined code.

46. The computer readable medium of claim 40, wherein the executable instructions further cause the system to:
  detect a wired interface of a third handset, wherein the third handset is the wireless handset; and
  retrieve a profile of the interface from a storage module.

47. An apparatus, comprising:
  means for receiving a connection request from a first handset, the connection request including an identification parameter;
  means for comparing the identification parameter to a predetermined code associated with a telephone calling area; and
  means for selecting a connection path between the first handset and a second handset, the connection path selected from a wired network and a wireless network based on a comparison of the identification parameter to the predetermined code, wherein the wireless network comprises a wired interface of a wireless handset.

48. The apparatus of claim 47, wherein the means for selecting the connection path comprises either:
  means for selecting a local connection path through the wired network, wherein the wired network is a public switched telephone network (PSTN); or
  means for selecting a long distance connection path through the wireless network, wherein the wireless network is a cellular network and the wireless handset is a cellular telephone.

49. The apparatus of claim 47, further comprising:
  means for detecting the wired interface of the wireless handset; and
  means for retrieving a profile of the interface from a storage module.

* * * * *